Oct. 18, 1966  O. G. BARNUM  3,279,339
SHOCK ABSORBING COMPACTOR WHEEL
Filed Sept. 14, 1964 2 Sheets-Sheet 1
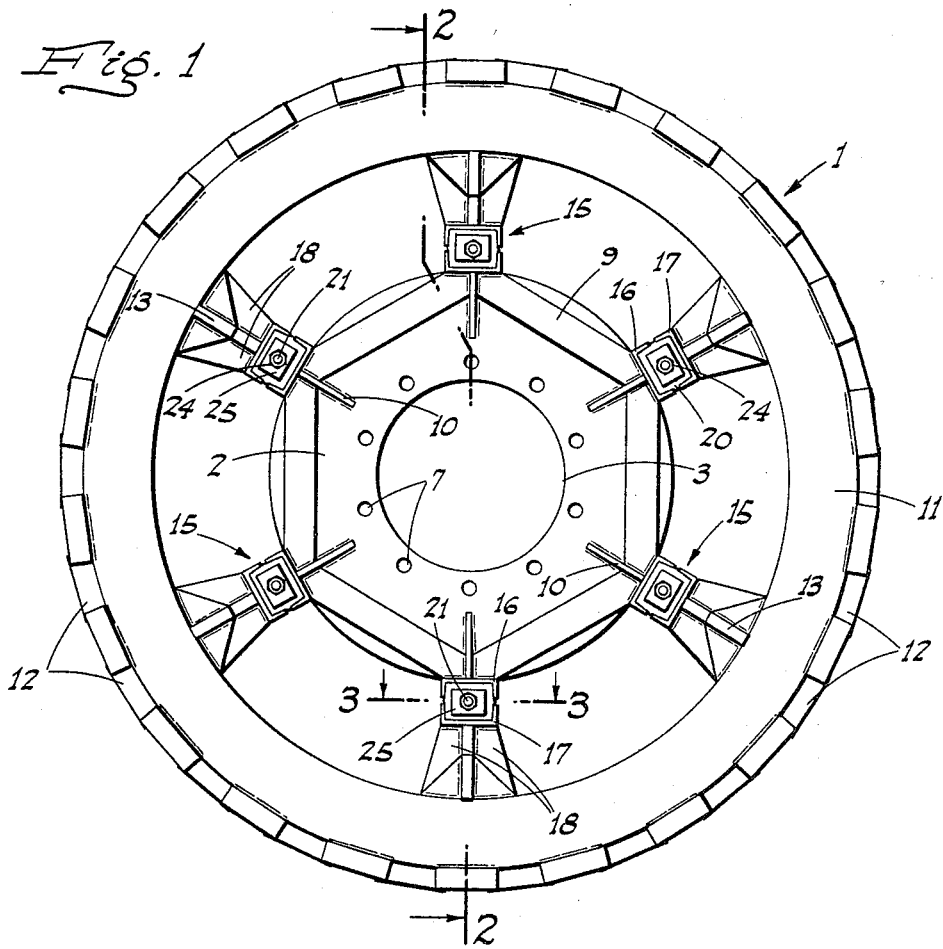
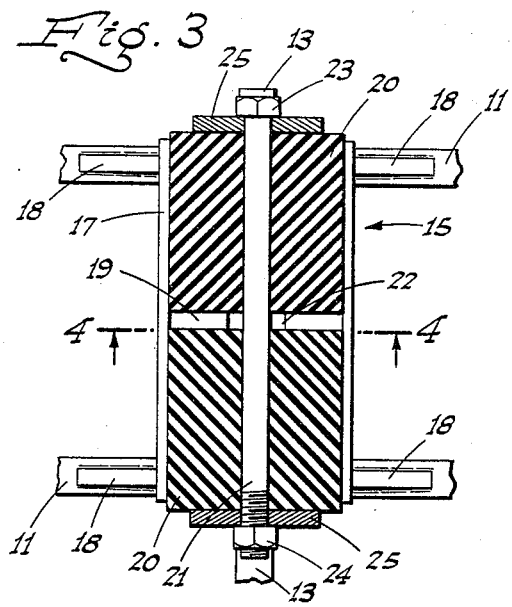
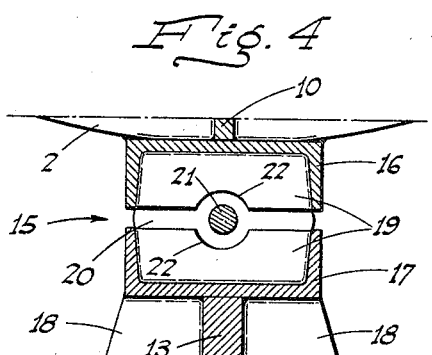
INVENTOR.
Orville G. Barnum
BY
Webster & Webster
ATTYS.

Oct. 18, 1966  O. G. BARNUM  3,279,339
SHOCK ABSORBING COMPACTOR WHEEL
Filed Sept. 14, 1964  2 Sheets-Sheet 2

United States Patent Office 3,279,339
Patented Oct. 18, 1966

3,279,339
SHOCK ABSORBING COMPACTOR WHEEL
Orville G. Barnum, South San Francisco, Calif., assignor to Pactor Corporation, West Sacramento, Calif., a corporation of California
Filed Sept. 14, 1964, Ser. No. 396,300
4 Claims. (Cl. 94—50)

This invention relates to compactor wheels such as are used on mobile implements for the purpose of compacting loose earth over which such an implement is run back and forth as, for example, in the construction of a road bed.

With the spaced tamping feet or pads used on such wheels to obtain the desired compacting action, the bearing members for the axles on which the wheels are mounted, and in fact all the components of the implement, are subjected to severe and damaging shocks in the absence of adequate shock absorbing means.

It is, therefore, the major object of the present invention to provide a compactor wheel, for the above noted purpose, which includes an improved form of shock absorbing means interposed between the outer, tamping-foot portions of the wheel and the inner, axle-mounted member of the wheel; said shock absorbing means being effective to prevent shocks and severe vibrations from being transmitted to the axle from said tamping-foot portions.

The shock absorbing means of the instant invention includes heavy duty rubber blocks, and another important object of the invention is to mount such blocks in a manner so that they may be readily and easily "taken up" or tightened should they become worn or fatigued, or may be replaced if necessary while the implement is still in the field.

It is also an object of the invention to mount the rubber blocks in such a manner that the outer, tamping-foot portions of the wheel and the inner, axle-mounted member are maintained—while the wheel is rotating—in substantially concentric relation with each other at all times, as well as in their predetermined relationship laterally of the wheel.

A further object of the invention is to provide a shock absorbing compactor wheel which is designed for convenience and economy of manufacture.

A still further object of the invention is to provide a practical, reliable, and durable shock absorbing compactor wheel and one which is exceedingly effective for the purpose for which it is designed.

These objects are accomplished by means of such structure and relative arrangement of parts as will fully appear by a perusal of the following specification and claims.

In the drawings:

FIG. 1 is a laterally inner side elevation of the improved compactor wheel, detached from the supporting axle.

FIG. 3 is an enlarged fragmentary cross section taken on line 3—3 of FIG. 1.

FIG. 4 is a fragmentary sectional elevation taken on line 4—4 of FIG. 3.

Figure 2:
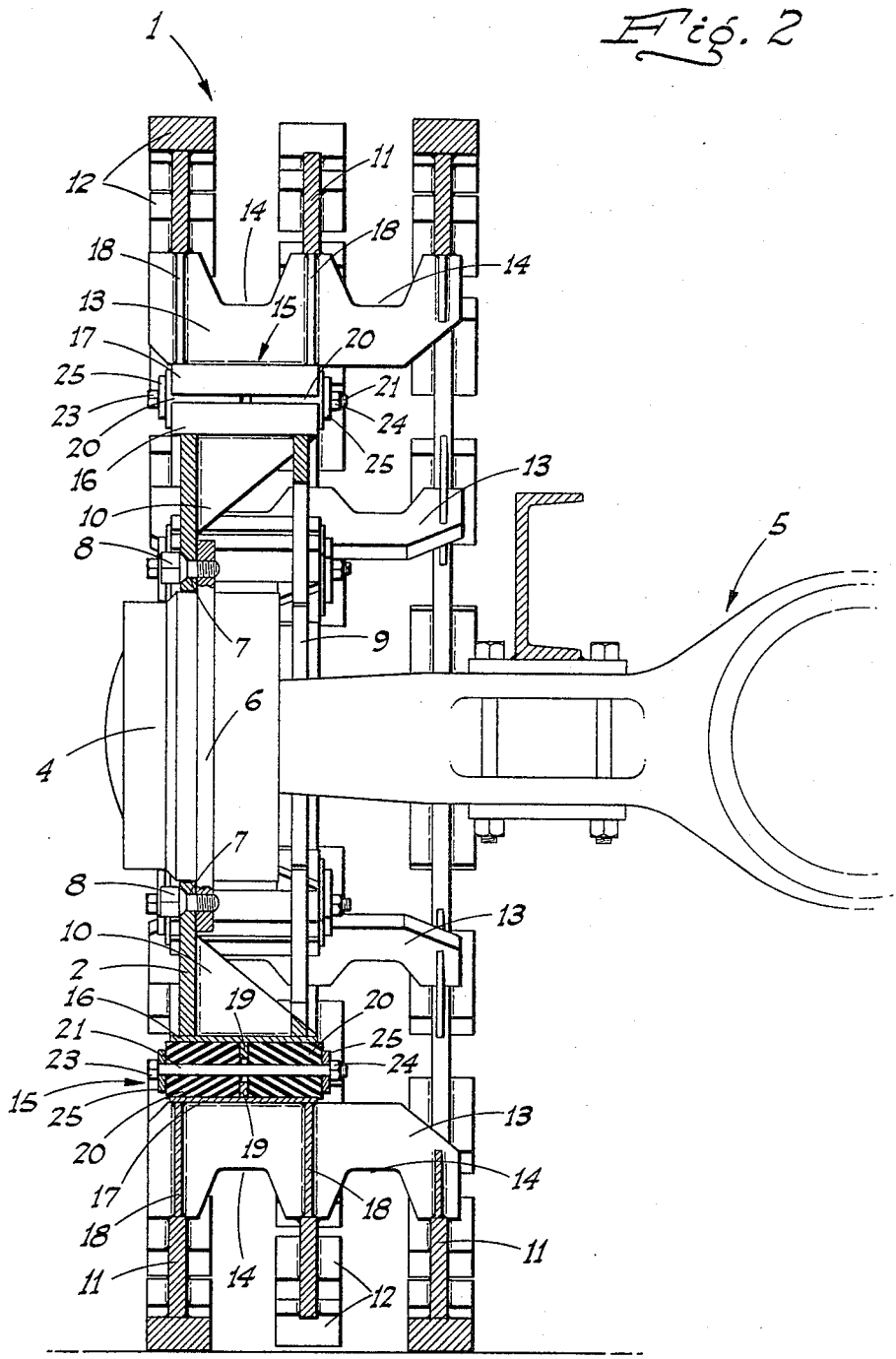
FIG. 2 is an enlarged transverse section of the wheel as mounted on the axle, and taken on line 2—2 of FIG. 1.

Referring now more particularly to the drawings and to the characters of reference marked thereon, the improved compactor wheel, indicated generally at 1, comprises a heavy disc 2 provided with a central bore 3 of a size to fit over and seat on the bearing-enclosing housing or similar axle-mounted member 4 of an axle unit 5; the disc then engaging against a backing flange 6 on said member 4. The disc 2, which forms the central axial member of the wheel, is provided with a row of bolt holes 7 about the opening 3 disposed to match the tapped holes already provided in the flange 6, so that the disc and flange may be detachably clamped together by bolts 8.

A certain distance laterally inward from the disc 2 and coaxial therewith, there is an endless rigid band 9 of polygonal and preferably hexagonal exterior contour no greater at any point than the diameter of the disc 2. The band 9 is relatively narrow in a direction radially of the wheel so that it will pass over the flange 6 without interference. Radially extending gussets 10 connect the disc 2 and band 9 at evenly spaced intervals about the same; said gussets being disposed at and intersecting the various corners of the band 9, as shown in FIG. 1.

Disposed some distance radially out from and concentric with the disc 2 are a plurality of laterally spaced, mounting rings 11 of somewhat deep and hence unyielding nature radially of the wheel; corresponding ones of such rings 11 being substantially alined transversely with said disc 2 and band 9, while a third ring is disposed laterally inwardly from the others. Ground tamping feet or pads 12 are secured on and extend about the peripheral edges of each of the rings 11 in spaced relation; the pads on adjacent rings being staggered—circumferentially of the wheel—relative to each other.

Transverse radially extending spoke-forming plates 13, alined with the radial gussets 10, connect the rings 11, and at their radially inner edges said plates 13 terminate some distance short of the peripheral plane of the disc 2. The spokes 13 are relieved or recessed at their radially outer edges, as shown at 14, so as to provide for the unobstructed passage of untamped dirt or debris between the mounting rings 11 with the advance of the implement on which the compactor wheel is mounted.

Circumferentially spaced shock absorbing units, indicated generally at 15, are disposed between and connect the adjacent or facing edges of the spoke-forming plates 13, and the disc 2 and band 9; each such shock absorbing unit being constructed as follows:

A radially outwardly facing, transverse channel 16 is secured to and spans between the peripheral edges of the disc 2 and band 9; said channel also being secured to the related gusset 10.

Another transverse channel 17, the same size as the channel 16, is disposed in symmetrical relation to said channel 16 but in a radially inwardly facing position and radially spaced therefrom a short distance as shown. The channel 17 is rigidly secured to the radially inner edge of the related spoke-forming plate 13, and said plate— together with the channel 17— are braced by gussets 18.

Each of the channels 16 and 17 is provided centrally of its ends with a full-depth partition 19, and blocks 20 of relatively hard but somewhat resilient rubber are seated in and fill the areas outlined by the facing channels between said partitions and the adjacent ends of said channels, the latter being open-ended.

A bolt 21 extends through the blocks 20 centrally thereof and between the partitions 19; the adjacent faces of the latter being recessed, as at 22, to clear such bolt. At one end, the bolt is provided with a head 23 and at the other end with an adjustable nut 24; the head and nut bearing against large rectangular washers 25 which engage the major areas of the exposed end portions of the blocks 20.

Although the compactor wheel is here shown as comprising three transversely spaced mounting rings 11 provided with pads 12, an additional one or more of such rings may be included by correspondingly extending the spoke-forming plates 13.

By reason of the above described features of construction, it will be seen that an efficient shock absorbing action is provided by the several units 15 as secured between the mounting rings 11 of the wheel and the central disc 2 thereof which is attached to the hub 4 of the implement. In other words, the units 15 substantially lessen the transmission of shocks from the outer tamping-foot portions of the wheel to the inner, axle-mounted member thereof, and consequently to the implement as a whole.

In addition to the shock absorbing function thereof, the units 15 assure that said rings 11 and disc 2 are maintained in substantially concentric relationship, as well as in their initial relative lateral positions.

These results are obtained because of the relatively hard but somewhat resilient rubber blocks 20, and the specific mounting means therefor; such mounting means including, for each unit 15, the channels 16 and 17, the fixed central partitions 19 therein, and the block-connecting bolt 21.

The spacing of the block-confining channels 16 and 17 from each other permits of a slight deformation of the blocks as may be occasioned when subjected to a load or sudden shock. The size of the end washers 25 relative to the channel-confined end areas of the blocks, also permits of a slight deformation of the blocks endwise under load and shock conditions.

The rigid central partitions 19 in the channels are effective—in connection with the one block-connecting bolt—to prevent longitudinal shifting of the blocks in the channels, thus avoiding the necessity of having to cement the blocks in the channels in order to keep them in place.

The nut 24 being adjustable on the bolt 21, enables the blocks to be "squeezed" to increase the rigidity of blocks in the event that they become somewhat worn or fatigued after a considerable period of use. Also, as the bolt 21 is removable from the related blocks, the latter can be replaced if necessary. The replacement operation can be done while the implement is still in the field; this requiring only that the wheel be turned so that the shock absorbing unit 15 to be worked on is disposed at the top of the wheel and hence relieved of any load.

From the foregoing description, it will be readily seen that there has been produced such a shock absorbing compactor wheel as substantially fulfills the objects of the invention, as set forth herein.

While this specification sets forth in detail the present and preferred construction of the shock absorbing compactor wheel, still in practice such deviations from such detail may be resorted to as do not form a departure from the spirit of the invention, as defined by the appended claims.

Having thus described the invention, the following is claimed as new and useful and upon which Letters Patent is desired:

1. In a compactor wheel which includes a central axial member adapted for connection to an axle-mounted element of a mobile implement, a ring member separate from the central member and surrounding the same in radially spaced, coaxial relation, said ring member having tamping elements about the periphery thereof, and shock absorbing units extending radially of the wheel between and connecting said wheel members at evenly spaced intervals thereabout and maintaining said members in substantially concentric relation with each other and against relative lateral movement; each of said shock absorbing units comprising a rigid channel facing radially outwardly and immovably secured transversely of the wheel to the radially outer edge of the central member, a separate rigid channel facing radially inwardly and immovably secured to the radially inner edge of the ring member in matching spaced relation to the first named channel, and relatively hard but resilient rubber blocks mounted in the channels and filling the area outlined thereby; the blocks being unsecured to the channel walls and said channels being open at both ends for the insertion and removal of the blocks into and from the channel area, centrally located transverse partitions fixed in the channels, said rubber blocks being on opposite sides of and abutting the partitions, and means removably connecting the blocks and preventing longitudinal separating movement thereof.

2. A structure, as in claim 1, in which said last named means comprises a bolt removably projecting through the blocks and past the partitions, the bolt having a head and an adjustable nut on opposite ends, and washers on the bolt engaging the outer opposed ends of the blocks under the head and nut.

3. A structure, as in claim 2, in which the washers are symmetrical in form to the cross sectional area of the blocks but of relatively slightly smaller dimensions.

4. A shock absorbing compactor wheel comprising a pair of axial transversely separated central members one of which is adapted for secured connection to an axle-mounted element of a mobile implement, radial gussets between and connecting the members at evenly spaced points about the same, a plurality of transversely separated ring members spaced radially out from but coaxial with the central members, certain of the ring members being in substantial alinement with corresponding central members in transverse vertical planes, tamping elements on and about the radially outer edges of the ring members, radial spoke-forming plates connecting the ring members in rigid relation and projecting radially inwardly therefrom in radial alinement with the gussets, and circumferentially spaced shock absorbing units extending between and connecting the central members and the spoke-forming plates; each shock absorbing unit comprising a rigid channel facing radially outwardly and extending transversely of the wheel between and secured to the radially outer edges of the central members, a separate channel facing radially inwardly and secured to the radially inner edge of the related spoke-forming plate in matching but spaced relation to the first named channel, and relatively hard but resilient rubber blocks removably mounted in the channels and filling the area outlined thereby.

References Cited by the Examiner
UNITED STATES PATENTS

| | | | |
|---|---|---|---|
| 825,821 | 7/1906 | Giles | 152—41 |
| 896,362 | 8/1908 | Childs | 152—42 |
| 1,213,834 | 1/1917 | Bunzlau | 152—42 |
| 1,292,299 | 1/1919 | Frommann | 152—44 |

JACOB L. NACKENOFF, *Primary Examiner.*